June 22, 1965 G. H. ZIMMERMAN 3,190,382
WEIGHING SYSTEM
Filed May 20, 1963 2 Sheets-Sheet 1

INVENTOR.
Gerald H. Zimmerman
BY
ATTORNEYS

June 22, 1965   G. H. ZIMMERMAN   3,190,382
WEIGHING SYSTEM
Filed May 20, 1963   2 Sheets-Sheet 2
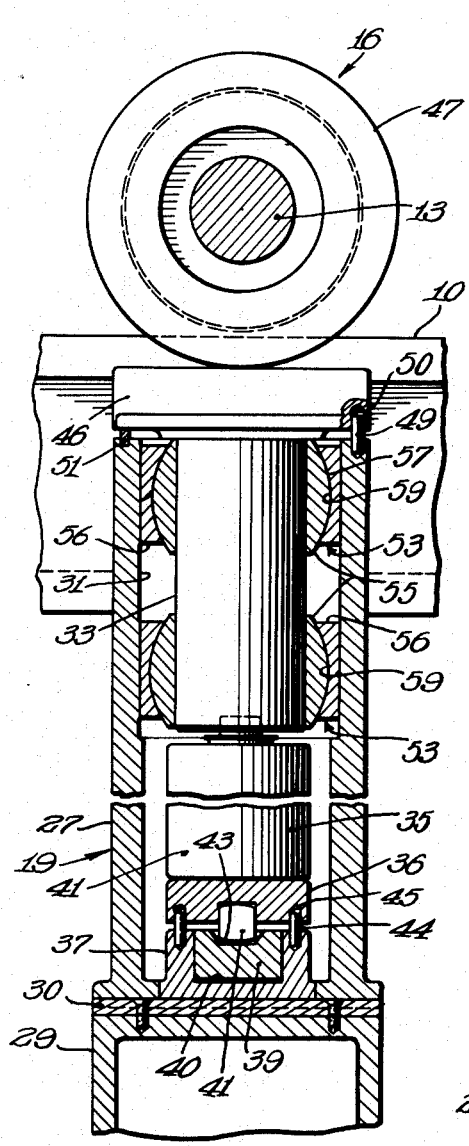
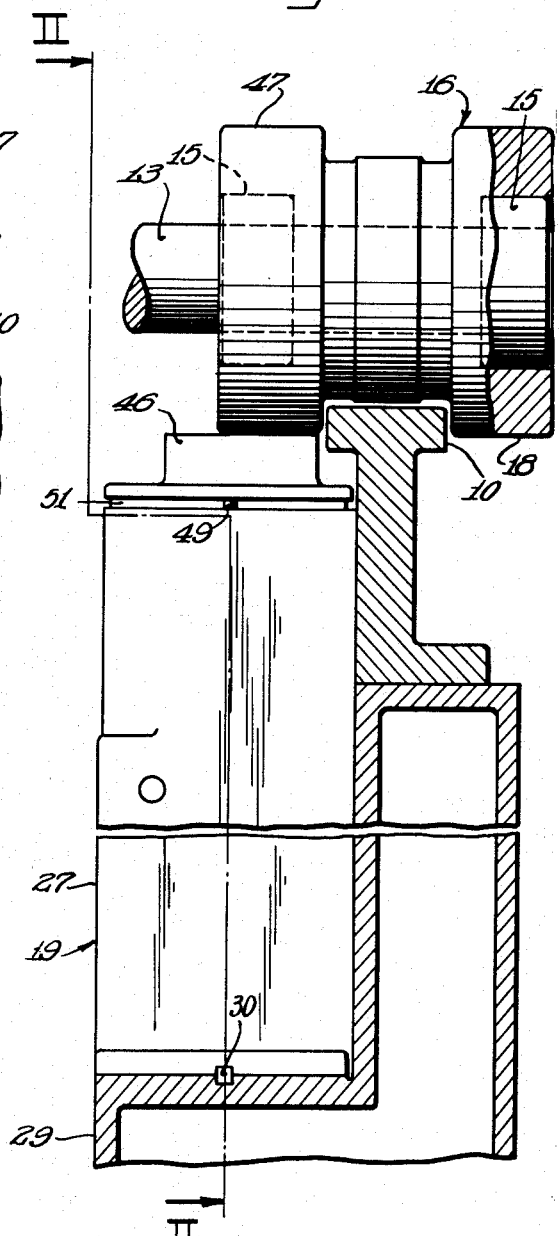
INVENTOR.
Gerald H. Zimmerman
BY
Hill, Sherman, Meroni, Gross & Simpson
ATTORNEYS

United States Patent Office 3,190,382
Patented June 22, 1965

3,190,382
WEIGHING SYSTEM
Gerald H. Zimmerman, Claymont, Del., assignor to Beloit Eastern Corporation, Downingtown, Pa., a corporation of Delaware
Filed May 20, 1963, Ser. No. 281,475
8 Claims. (Cl. 177—132)

This invention relates to improvements in apparatus for weighing rolls of paper and the like.

Heretofore, rolls of paper coming from the wind-up along a track have been removed from the track for weighing, or the track has been provided with a pivoted portion over the scale, which is depressed by the weight of the roll to effect weighing of the roll. A roll of paper 200 inches in width, however, will weight approximately 50,000 pounds, so it is a laborious process to remove the roll for weighing, and where a track section is pivoted the support for the track section must of necessity be rugged. With such weighing stations the pivoted track and mechanism for returning the track to a level position after weighing, place inaccuracies in the weighing, and in addition to the added cost of such weighing stations, such stations are not suited for high speed operation where it is desirable that the rolls be instantaneously weighed.

In order to simplify and speed up the weighing operation, and to enable the rolls of paper to be rapidly weighed in succession without removal from the rails leading from the wind-up, I contemplate using load cells in the form of strain gage pressure transducers, in which a physical displacement is converted into an electric signal, to determine the weight of the rolls of paper as they pass onto the load cells. In weighing by the use of load cells, the roll of paper may ride up onto support pads mounted on the end of push rods supported on the load cells. It has been difficult, however, to exactly center the rolls of paper with respect to the load cell with the result that off center loads may bend the push rods and cause binding between the push rods and their guides, with a resultant inaccuracy in weighing.

A principal object of the present invention is to provide an improved form of weighing device and system for rapidly weighing rolls of paper without removing the rolls from the track leading from the wind-up, and so arranged as to increase the accuracy and speed of weighing.

A further object of the invention is to provide a weighing system for rolls of paper and the like, in which off center loads on the weighing device are compensated for in a simple and efficient manner.

A still further object of the invention is to provide an apparatus for weighing rolls of paper as they travel along an inclined track from the wind-up, in which the rolls ride up onto support pads of the weighing system and are automatically stopped in generally centered relation with respect to these pads and are weighed by the depression of push rods extending from the pads, and in which eccentricities in the loads on the support pads are compensated for utilizing self-aligning bushings to guide the push rods along their housings.

A still further object of the invention is to improve upon the systems heretofore used in weighing heavy rolls of paper, by utilizing a load cell to convert the physical displacement of a push rod supporting the roll into an electrical signal and by avoiding the inaccuracies in weighing, which may be caused by binding of the push rod by guiding the push rod along its guides by spaced self-aligning bushings.

These and other objects of the invention will appear from time to time as the following specification proceeds and with reference to the accompanying drawings wherein:

FIGURE 2 is an enlarged vertical sectional view taken longitudinally of the support rails for the rolls of paper with certain parts shown in solid and looking substantially along line II—II of FIGURE 3; and FIGURE 3 is a view taken transversely of the rails and illustrating certain details of the support of the roll shaft on the weighing apparatus not shown in FIGURES 1 and 2.

Figure 1:
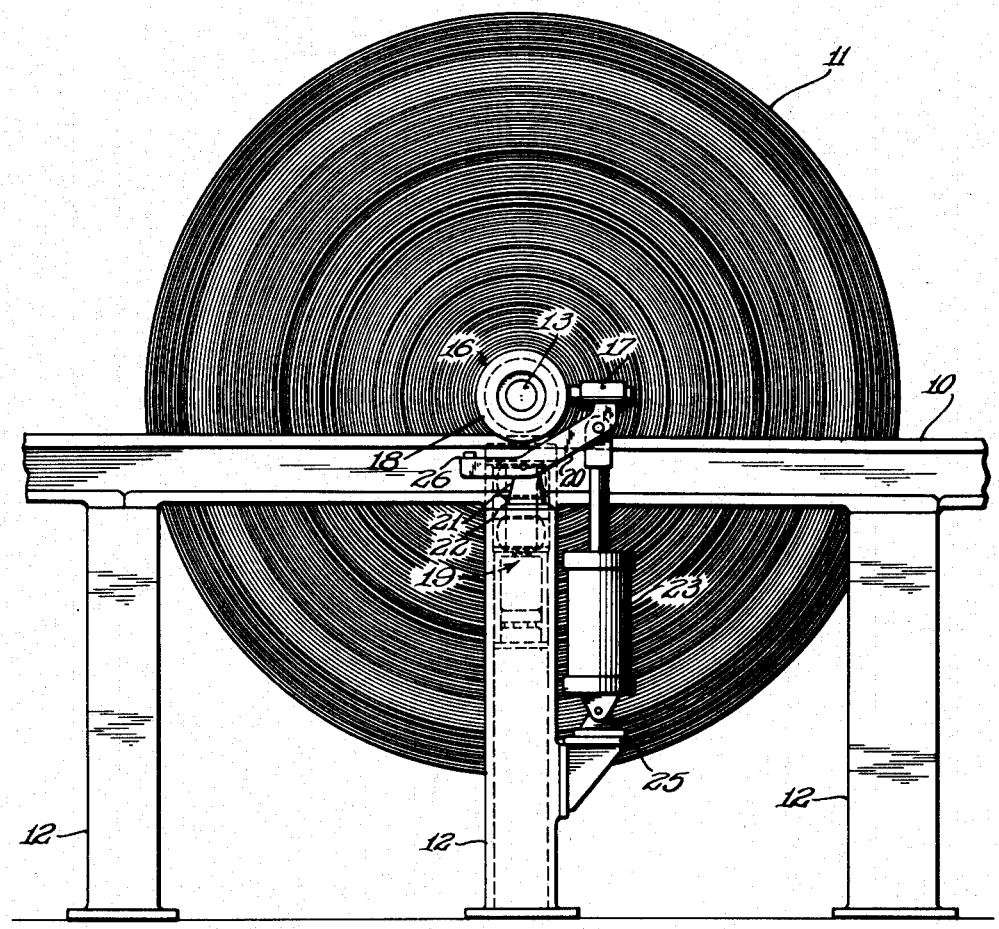
FIGURE 1 is a diagrammatic view in side elevation of a weighing station constructed in accordance with the principles of the present invention.

In the embodiment of the invention illustrated in the drawings, I have shown in FIGURE 1 a sloping rail 10 forming one rail of a track, supporting rolls of paper 11 for movement therealong by gravity from a wind-up station, for weighing. The rail 10 is supported in vertically spaced relation with respect to the ground on posts 12, 12 mounted on the floor or a suitable foundation frame structure.

The roll 11 is mounted on a roll shaft 13 journalled at its ends in bearings 15, 15 carried in a dumbbell bearing housing 16, riding along the rail 10 on the reduced diameter portion thereof between the bearings 15, 15.

Retractible stops 17 are mounted on the outsides of the rails 10 in outwardly spaced relation with respect to the associated rail, to engage outer enlarged diameter portions 18 of the bearing housing 16 and locate the bearing housings in centered relation with respect to a weigh station 19 to effect weighing of the roll of paper supported on the dumbbell bearing housings. The retractible stops 17 are mounted on arms 20 transversely pivoted to spaced ears 21 projecting outwardly from a ledge 22 extending outwardly of and mounted on an associated post 12. The stops 17 are held in position and retractibly moved with respect to the bearing housing 16 by fluid pressure jacks 23. Each jack is pivotally connected to an associated stop 17 at its upper end and to a ledge 25, mounted on and projecting forwardly of a post 12 at its lower end. The stops 17 are thus positioned to engage the outer enlarged diameter portions 18 of the bearing housings 16 and stop travel thereof as they move along the rails 10, and retract said stops at the completion of the weighing operation to accommodate the roll 11 to pass along the rails for further treatment or use. The arms 20 have ejector arms 26 on the opposite sides of the pivots thereof from the stops 17 and engaging the bearing housings 16 as the stops 17 are released, to assure that the roll continue its travel without interruption.

The weigh station 19 includes spaced housings 27 mounted on the insides of the rails 10 on a cross frame structure, and located in position with respect to said cross frame structure, and the associated rail 10, by a locating key 30, shown in FIGURE 2 as extending in the direction of the associated rail 10. The housing 19 may be cylindrical in form and may have a cylindrical interior wall 31, herein shown as being stepped and having a push rod 33 guided for vertical movement along the wall 31 in a manner which will hereinafter more clearly appear as this specification proceeds.

The push rod 33 is supported at its lower end on a load cell 35, which in turn is supported on and projects upwardly from a base member 36 located with respect to a base 37 at the bottom of the housing 27 by a key 41. As shown in FIGURE 2, the base 37 is of a cup-like form and forms a support for a pad 39. The position of the pad 39 with respect to the base 37 may be vertically adjusted by placing shims 40 between the bottom of the pad 39 and a top surface of the cup-like portion of the base member 37. The key 43 extends across the base member 36 and is partially recessed therein and has limited rockable engagement with a transversely extending upwardly opening slot 43 extending across the base 39. The slot 43 diverges toward its upper end portion to accommodate limited freedom of movement and alignment of the base 36 with respect to the pad 39. A series of dowel pins 44 project upwardly of the base member 37 outwardly of the pad 39, and loosely extend within downwardly opening recessed or drilled portions 45 in the base member 36.

The load cell 35, as previously mentioned, may be a strain-gage pressure transducer in which a physical displacement of the push rod 33 is converted into an electric signal which may be used to determine the weight on the upper end portion of said push rod and is a commercial article of manufacture so need not herein be shown or described in detail.

A separate support pad 46 is mounted on the upper end of each push rod 33 and extends over the top of the housing 27 and forms a support for an inner enlarged diameter bearing housing portion 47 of the dumbbell housing 16 as the roll of paper rides downwardly along the rails 10. The bearing pads 46 engage and support the enlarged diameter portions 47 of the dumbbell bearing housings 16. This raises the reduced diameter portions of the dumbbell bearing housing 16 above the top surfaces of the rails 10 a distance sufficient to accommodate weighing of a roll of paper 11 carried on the roll shaft 13 and supported at its opposite ends on the dumbbell bearing housings 16. The support pad 46 is located with respect to the housing 27 as by one or more dowel pins 49, mounted in the wall of the housing 27 and projecting upwardly therefrom into loose engagement with a downwardly opening socket 50 formed in the support pad 46. Suitable sealing means 51 may be provided to keep dust and dirt from the inside of the housing.

Referring now to the guide for the push rod 33 along the wall 31 of the housing 27 and permitting accurate weighing of a roll of paper 10 when the load is not directly centered over the load cell 35, two spaced self-aligning bushings 53 are mounted on the push rod 33 and have slidable engagement with the wall 31 of the housing 27. The self-aligning bushings may be commercial forms of bushings so are only herein shown in a schematic manner and include bearing members 55, 55 pressed on the push rod 33, adjacent the upper and lower ends thereof and bushing members 56 carried by said bearing members and having slidable engagement with the wall 31 of the housing 27. The bearing members 55 are shown as having semi-hemispherical bearing faces 57, engageable within corresponding convex faces 59 of the bushing members 56.

The self-aligning bushings 53 may thus compensate for bending of the push rods 33 and assure that off-center loads transmitted through the push rods to the load cells will always be in a vertical direction in centered relation with respect to the load cells and will thereby compensate for off-center loads on the push rods and will prevent binding between the push rods and the walls 31 of the housings 27.

In an operation of the device, rolls of paper 11 come off the wind-up reel (not shown) at a relatively rapid rate and in order that the weighing operation may keep up with the delivery operation of the wind-up reel, more than one weighing station may be successively spaced along the rails 10, 10. The first roll to be weighed may then move along the rails 10, 10 by gravity to the second weighing station while the next succeeding roll may move along the rails to the first weighing station. As the rolls pass to the weighing stations, the stops 17, 17 are extended to engage the outer enlarged portions 18, 18 of the dumbbell housings 16, and stop the housings and roll of paper in centered relation with respect to the support pads 46, it being understood that as the bearing housings approach the stops 17, 17 they ride up onto the support pads 46, 46 and are elevated by said support pads out of contact with the rails 10, 10, to accommodate the roll of paper mounted thereon to be weighed. As the bearing housings ride up onto the support pads 46, 46 a weight reading may be instantaneously obtained, and the accuracy of the weight reading is assured regardless of the fact that the entire load may not be directly centered over the centers of the load cells, due to the self-aligning bushings slidably mounting the push rod 33 within its associated housing 31, and thereby compensating for any off-center weight on said push rod and any bending of the push rod caused by this weight.

It may be seen from the foregoing that a simplified form of weighing system has been provided for weighing rolls of paper without removing the roll of paper from the rails leading from the wind-up, and which also eliminates the pivoted rail sections and weigh beams heretofore used, and assures accurate weighing of the roll of paper regardless of the centered relation of the roll with respect to its load cells.

While I have herein shown and described one form in which the invention may be embodied, it may readily be understood that various variations and modifications in the invention may be attained without departing from the spirit and scope of the novel concepts thereof.

I claim as my invention:

1. In an apparatus for weighing rolls of paper and the like, spaced rails spaced above the ground and extending at an incline and forming a track for a roll of paper, vertical housings on the insides of said rails, a support pad extending over the top of each housing and having a push rod depending therefrom within an associated housing, a base for said housing, a weight determining means interposed between said base and push rod, said support pads supporting a roll of paper out of contact with said rails for weighing, means for guiding said push rods along said housings and compensating for off-centered loads on said support pads and push rods comprising spaced self-aligning bushings mounted on said push rods and having slidable engagement with the cylindrical walls of said housings, and retractible stop means positionable to accommodate a roll of paper to ride up onto said support pads and to stop the roll of paper in generally centered relation with respect to said support pads.

2. An apparatus particularly adapted for weighing rolls of paper comprising a base, a cylindrical housing projecting upwardly from said base and having an inner cylindrical wall, a weight determining unit supported within said housing, a push rod having a lower end supported on and extending upwardly from said weight determining unit and having an upper end extending above the top of said housing and adapted to support an end of a roll of paper, and means guiding said push rod for slidable movement along said housing and preventing binding of said push rod with the cylindrical wall of said housing upon the placing of off-centered loads on said push rod, comprising a pair of vertically spaced self-aligning bushings mounted on said push rod and spaced vertically apart along the wall of said housing and having free slidable movement along the wall of said housing said bushings supporting said push rod within said housing to bend laterally therebetween upon the placing of an off-center load on its top, without interfering with vertical movement of said push rod along said housing, during a weighing operation.

3. An apparatus particularly adapted for weighing rolls of paper comprising a base, a cylindrical housing projecting upwardly from said base and having an inner cylindrical wall, a weight determining unit supported within said housing, a push rod supported on and extending upwardly from said weight determining unit above the top of said housing and adapted to support an end of a roll of paper, and means guiding said push rod for slidable movement along said housing and preventing binding of said push rod with the cylindrical wall of said housing upon the placing of off-centered loads on said push rod, comprising spaced bearing members mounted on said push rod and having semi-hemispherical convex faces, and bushings having mating concave semi-hemispherical faces conforming to the semi-hemispherical convex faces of said bearing members and having outer cylindrical wall portions having slidable engagement with the wall of said housing.

4. An apparatus for weighing rolls of paper and the like comprising a track having laterally spaced inclined rails, roll shaft bearings guided for movement along said rails, a roll shaft supported in said bearings and having a roll of paper thereon, weigh means on the insides of said rails supporting said roll shaft bearings out of contact with said rails for weighing, said weigh means including vertically guided push rods upon which said roll shaft bearings ride as they engage said stop means, vertically spaced self-aligning bearings vertically guiding said push rods and preventing binding thereof due to off-center loads thereon weight determining means supporting said push rods, and retractible stop means positionable to accommodate the roll shaft bearings to ride up onto said push rods and to stop the roll shaft bearings and roll in generally centered relation with respect thereto, for weighing.

5. An apparatus for weighing rolls of paper and the like comprising a track including laterally spaced inclined rails, roll shaft bearings guided for movement along said rails, a roll shaft and roll supported on said bearings, said weigh means including at least one vertically extending housing opening to the top thereof on the inside of one of said rails and having an inner cylindrical wall, a base, a load cell within said housing supported on said base and comprising a strain-gage pressure transducer, a push rod supported on said load cell and movable downwardly along said housing against said load cell, upon the placing of a load thereon, means for guiding said push rod for movement along said housing and compensating for off-center loads on said push rod and load cell comprising a pair of vertically spaced self-aligning bearings mounted on said push rod and having slidable engagement with the wall of said housing, and retractible stop means positionable to accommodate said roll shaft bearings to ride up onto said push rods and to stop in generally centered relation with respect thereto.

6. An apparatus for weighing rolls of paper and the like comprising, a frame, laterally spaced roll shaft bearings movable along said frame, a roll shaft supported on said bearings and having a roll of paper mounted thereon, laterally spaced weigh means mounted on said frame for supporting said roll shaft bearings, said weigh means including upwardly opening vertically extending housings having inner cylindrical walls having push rods guided for vertical movement therealong and forming supports for said roll shaft bearings, and a pair of vertically spaced self-aligning bearings mounted on each push rod and having slidable engagement with the inner cylindrical wall of the associated housing to compensate for off-center loads on said push rods, said frame including spaced rails extending to one side of said weigh means, supporting said roll shaft bearings for movement along said frame in position to roll upwardly onto the tops of said push rods, and retractible stop means positionable to accommodate the roll shaft bearings to ride up onto the tops of said push rods and to stop the roll of paper in generally centered relation with respect thereto, for weighing.

7. An apparatus particularly adapted for weighing rolls of paper comprising a base, a housing projecting upwardly from said base and having an inner wall, a weight determining unit supported within said housing, a push rod having a lower end supported on and extending upwardly from said weight determining unit with an upper end extending above the top of said housing and adapted to support an end of a roll of paper, and means guiding said push rod for slidable movement along said housing and preventing binding of said push rod with the inner wall of said housing upon the placing of off-centered loads on said push rod, comprising a pair of self-aligning bearing means mounted on said push rod and spaced vertically apart a substantial distance along the wall of said housing and positioned adjacent said lower and upper ends of the rod and accommodating free vertical movement of the rod along the wall of said housing, said rod being free of lateral restriction intermediate said bearing means to permit free lateral bending due to an off-center load at the top end thereby permitting unrestricted vertical movement and accurate weighing of a roll of paper supported on the upper end of said rod.

8. An apparatus particularly adapted for weighing rolls of paper comprising a base, a housing projecting upwardly from said base and having a wall with an inner surface, a weight determining unit supported within said housing, a push rod having a cylindrical outer surface and supported on its lower end by and extending upwardly from said weight determining unit above the top of said housing and adapted to support an end of a roll of paper on its upper end and vertically spaced upper and lower self-aligning guide means mounted on said push rod and spaced vertically along the wall of said housing and guiding said push rod for vertical movement along said housing and preventing binding of said push rod with the wall of said housing upon the placing of off-centered loads on said push rod, each comprising spaced bearing and bushing members mounted between the outer surface of said push rod and the inner surface of said housing, having convex faces and having mating concave faces conforming to the convex faces, said bearing members and bushings accommodating vertical movement of said rod relative to the housing with said rod being free of lateral support between said guiding means so that said rod can bend laterally outwardly therebetween due to off-center loads at the top end.

References Cited by the Examiner

UNITED STATES PATENTS

| | | | |
|---|---|---|---|
| 377,717 | 2/88 | Kline | 214—1 |
| 1,555,077 | 9/25 | Ramsay | 214—45 |
| 1,766,105 | 6/30 | Cole | 242—58.6 X |
| 1,821,661 | 9/31 | Miller | 177—154 X |
| 2,472,047 | 5/49 | Ruge | 73—141 |
| 2,920,880 | 1/60 | Laycock | 177—211 |
| 2,998,090 | 8/61 | Watson | 177—211 |

LEO SMILOW, *Primary Examiner.*

LEYLAND M. MARTIN, *Examiner.*